INVENTOR.
PAUL K. DAVIS

April 26, 1966  P. K. DAVIS  3,247,692
PIPE MAKING MACHINE AND METHOD
Filed Oct. 10, 1961  4 Sheets-Sheet 3

INVENTOR.
PAUL K. DAVIS
BY
Boyken, Mohler + Wood
ATTORNEYS

United States Patent Office 3,247,692
Patented Apr. 26, 1966

3,247,692
PIPE MAKING MACHINE AND METHOD
Paul K. Davis, Alameda, Calif., assignor to Pacific Roller Die Company, Inc., a corporation of California
Filed Oct. 10, 1961, Ser. No. 144,249
17 Claims. (Cl. 72—49)

This invention relates to apparatus and method for making pipe and more particularly to helically forming pipe from an elongated strip of flat sheet metal.

Heretofore various machines and methods have been proposed for use in forming pipe by bending an elongated strip of sheet metal or the like into helical convolutions and joining or connecting the adjacent edges of the convolutions by welding, forming a lock seam, or the like. In these prior machines and methods substantial friction has been developed in forcing the strip around a stationary mandrel, or substantial and uneven stresses have been set up in the pipe in the forming operation, or control over the strip during forming has been incomplete.

The problems inherent in forming pipe by helically bending a strip are more severe in the case of corrugated wall pipe because of the substantially greater forces required to bend a corrugated strip.

Corrugated sheet metal pipe of the general type herein described is commonly used for underground drains, culverts, and the like and may be hereinafter referred to as "culvert pipe." Such pipe has heretofore been made in diameters ranging from approximately six inches to over 48 inches. Especially in the larger sizes, that is over 12-inch diameter, such pipe has been made by curving relatively short sections of corrugated sheet metal (about an axis generally normal to the corrugations), riveting or welding the ends of the curved section together to form a short length of pipe, and then joining such short sections by riveting, welding or the like. Such machinery as has been used to form culvert pipe by this method is essentially hand operated and the process is a time-consuming and expensive one. Furthermore, inherent defects in sheet metal joints formed by riveting or welding detract from the fluid carrying capabilities of the pipe.

Formation of helically corrugated culvert pipe in the smaller sizes of 6 to 21 inch diameters has been accomplished but, it is understood, not without some difficulties. In prior machines a sheet metal strip has been bent or curled in the form of helical convolutions about a forming shoe or mandrel to the desired diameter and the adjacent edges of the convolutions joined to complete the pipe. Among materials used for such pipe is relatively thin steel sheet carrying a galvanizing or other protective coating. The use of such prior machines has, in some instances, resulted in defacing and consequently destroying the effectiveness of such coatings.

Furthermore, so far as is known, such machines have been restricted to the formation of a single size of pipe for each size of forming shoe employed therewith. The time required to change such a machine from producing one size of pipe to another has therefore been extensive, resulting in increased labor costs and extended periods when the machine was unproductive. In addition, because such machines have not provided for complete control of the sheet metal strip throughout the forming operation, production speeds of such machines have been substantially curtailed.

Since all presently available culvert pipe in the larger sizes is of the riveted type in which the corrugations are normal to the pipe axis, it is assumed that such prior machines have not been capable of forming helically corrugated pipe in such larger sizes.

It is therefore an object of this invention to provide improved apparatus and method for forming pipe by helically convoluting an elongated strip of sheet metal and the like, which apparatus and method overcome many of the problems of the prior art devices proposed for similar use.

It is another object of this invention to provide apparatus for forming helically corrugated sheet metal pipe in a substantial variety of sizes and lengths.

It is still another object of this invention to provide a method of continuously forming sheet metal pipe with an integral seam therein.

Yet another object of this invention is the provision of a method of forming corrugated sheet metal pipe from a flat strip of sheet metal by continuously corrugating and curling said strip into helical convolutions and at the same time joining adjacent edges of said convolutions into a continuous seam without unduly stressing the same.

It is a further object of this invention to provide apparatus for forming sheet metal pipe, which apparatus may be readily adjusted to form different sizes of pipe.

A still further object of this invention is the provision of a machine for continuously forming a flat elongated strip of sheet metal with longitudinal corrugations and thence curling it into a helically corrugated pipe and maintaining said corrugations during said curling.

Yet another object of this invention is the provision of a machine and method for forming corrugated sheet metal pipe from an elongated strip of sheet metal, in which the strip is maintained under complete control throughout forming.

Other objects and advantages will become apparent from the following description taken in connection with the accompanying drawings, in which.

In general, the apparatus of this invention (FIG. 1) is arranged in a number of stations at which the components of the apparatus perform the sequence of steps in the method of forming sheet metal pipe 1 from an elongated strip of sheet metal 2. At the corrugating station, a carriage, generally designated 3, receives the strip 2, forms longitudinal ridges and valleys in the same and advances it through the forming device, generally designated 4, at the forming station where the strip is continuously formed into the pipe 1. The pipe then proceeds to a discharge station where it may be received on a run out table for further processing, such as cutting to length and further handling not herein described in detail.

Figure 1:
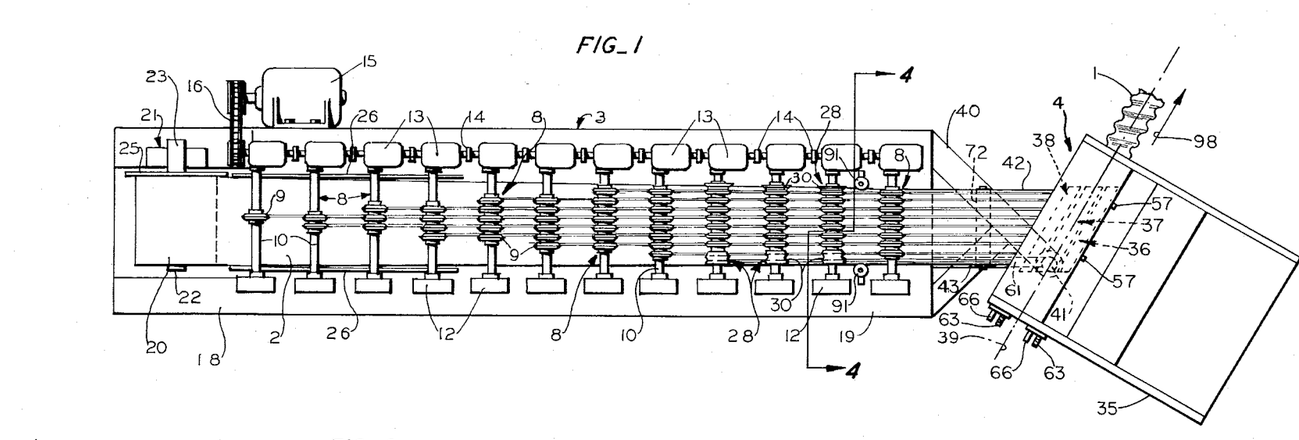
FIG. 1 is a top plan view of the apparatus of this invention.

Carriage 3 is an elongated frame, supported for rolling movement on ground wheels 7 (FIG. 2) and carrying on its upper side a plurality of corrugating rolls 8 (FIG. 1). Corrugating rolls 8 are arranged in a plurality of stands or matched pairs (FIGS. 2, 3) each having an upper roll and a lower roll. The stands of rolls 8 are generally horizontally aligned so that the strip 2 will pass between the upper and lower rolls of each stand and be deformed thereby into corrugations as said strip passes from the input end 18 toward the output end 19 of carriage 3.

Each of said rolls comprises one or more wheels or rollers 9 (FIG. 3) secured as by key 27 (FIG. 3A) to a shaft 10 with spacers 11 separating said wheels so that their peripheries correspond to the desired spacing of the ridges and valleys comprising the corrugations to be formed in strip 2. The shafts 10 of each stand are supported in bearings 12 at one end and a bearing and gear box combination 13 at the other end. Each gear box interconnects the upper and lower rolls of each pair for driving together and all the gear boxes 13 are connected by coupling shafts 14 and to drive motor 15 (FIG. 1), as by pulley drive 16, so that all the rolls 8 are driven together at the same speed. The upper rolls 8 of each stand are vertically adjustable, by any suitable means 17 (FIG. 2), so the proper spacing between the upper and lower rolls conforming to the desired depth of the ridges and valleys of the corrugations may be set.

In the embodiment illustrated in FIG. 1 there are eight stands of corrugating rolls 8 for progressively forming eight corrugations across width of strip 2. The wheels 9 of each lower corrugating roll are, of course, offset so as to bisect the spaces between the wheels of the corresponding upper corrugating roll for forming the alternating ridges and valleys of the corrugations.

Figures 3, 3A, 3B:
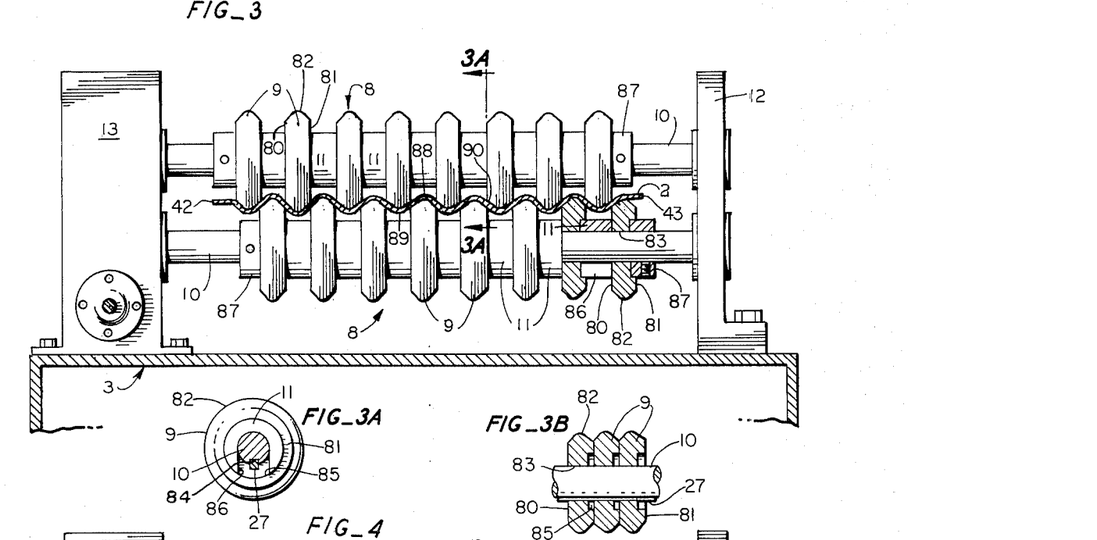
FIG. 3 is an enlarged sectional view as seen from line 3—3 of FIG. 2, partly broken away to show details of the corrugating rolls.
FIG. 3A is a sectional view taken generally along line 3A—3A of FIG. 3.
FIG. 3B is a partial view similar to FIG. 3 showing the corrugating rolls in a different relationship.

It will be understood that the number of stands of corrugating rolls, the number of wheels or rollers 9 per stand, the spacing between the wheels (which establishes the spacing between corrugations), and the diameters of wheels 9 and the spacing between the corrugating rolls of each stand (which establishes the depth of the corrugations) may be varied as desired. For example, FIG. 3 shows rollers 9 in a spaced condition resulting in an extended spacing between the ridges and valleys formed in strip 2 which is more suitable for heavier gage sheet metal in forming larger sizes of pipe. For forming a lighter gage strip into smaller diameter pipe, rollers 9 may be positioned in abutting relation (FIG. 3B) on shaft 10, resulting in a closer spacing of the ridges and valleys of the corrugations formed. In the latter instance the upper rolls of the corrugating stands are preferably spaced farther from the lower rolls thereby effecting shallower corrugations.

Spacers 11 and rollers 9 are so constructed that the same sets of rollers may be employed in either instance without removing shafts 10 from their supporting bearings 12, 13. Rollers or wheels 9 are each essentially a circular disc having a pair of opposed surfaces 80, 81 (FIGS. 3–3B) and a periphery 82 that is generally V-shaped in cross-section with a rounded apex conforming it to the desired shape of the ridges or valleys (being merely inverted ridges) to be formed. A central bore 83 receives shaft 10 therethrough and a keyway 84 (FIG. 3A) receiving key 27 locks roller 9 on shaft 10 for rotation therewith but permits said roller to be axially displaced along said shaft.

One surface 81 of roller 9 is provided with a concentric recess 85 adapted to receive a portion of spacer 11 therein. Said spacer is generally horseshoe shaped with its outer periphery fitting recess 85 and having a U-shaped notch 86 opening outwardly of its periphery and wide enough to receive shaft 10 therein.

Assuming a plurality of rollers 9 are held in the closed, abutting position of FIG. 3B by a pair of end collars 87 (FIG. 3) secured to shaft 10, said collars may be loosed and rollers 9 spread apart along said shaft to a spacing greater than the thickness of spacers 11. A spacer 11 is then placed between each pair of adjacent rollers with shaft 10 received in the bottom of notch 86 and rollers 9 pushed together, with a portion of each spacer received in a recess 85, and secured in spaced condition (FIG. 3) by collars 87. It will be noted that recess 85 not only prevents axial movement of spacer 11 but said spacer also lends radial support to an adjacent roller 9. In this manner any desired spacing of rollers 9 may be accomplished by inserting spacers of the proper thickness between said rollers without requiring access to the ends of shaft 10.

Figure 2:
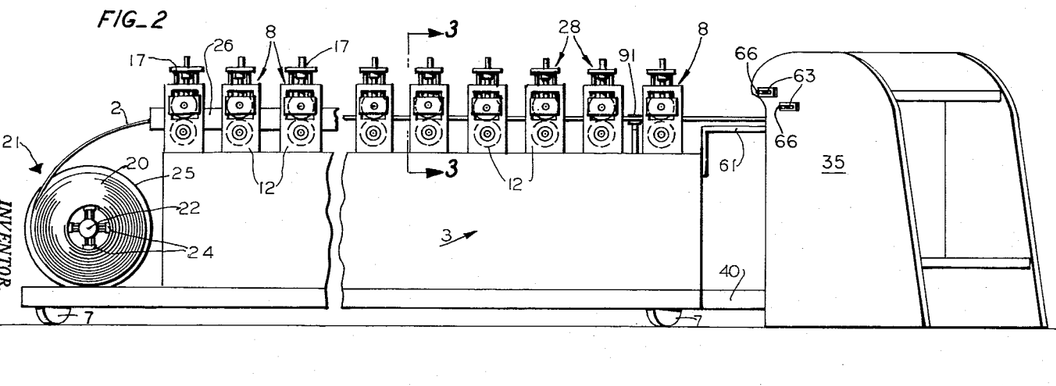
FIG. 2 is a side elevational view of the apparatus of FIG. 1.

The sheet metal strip 2 is preferably fed into the corrugating rolls 8 from a coil 20 supported at the input end 18 of carriage 3 on a coil reel 21 (FIGS. 1, 2). Reel 21 comprises a center shaft 22, journalled for rotation in a support bearing 23 fixed on carriage 3, and projecting through the central core of coil 20. Shaft 22 carries a plurality of expandable pads 24 (FIG. 2) which engage the inner diameter of the coil. A circular backing plate 25 secured on shaft 22 adjacent bearing 23 serves to maintain the edges of strip 2 in coil 20 flush. If desired, guiding means, such as side flanges 26 (FIGS. 1, 2) or edge rollers may be positioned at the opposed longitudinal edges of sheet metal strip 2 for guiding the same into proper relation with corrugating rolls 8.

As the flat strip of sheet metal progresses through the stands of corrugating rolls 8 illustrated in FIG. 1 it is formed with the longitudinally extending series of corrugations shown in section in FIG. 3. Following the corrugating roll stands are a plurality of stands of rolls 28 (FIGS. 1, 4) which partially form similar, opposed lock seam elements 29 along the opposed longitudinal side edges of strip 2. Rolls 28 are similarly mounted in stands of upper and lower rolls aligned to receive the strip 2 therebetween from the corrugating rolls. Each roll 28, in addition to a plurality of rollers 9, includes a pair of end rollers or wheels 30 (FIGS. 1, 4) similarly secured on a shaft 10 supported in bearings 12 and 13 and similarly driven. Rollers 30 are each provided with a peripherally projecting portion 33 (FIG. 4) similar to the periphery of a roller 9 for engaging a ridge or valley adjacent the longitudinal side edges 42, 43 of the strip 2. In addition to portions 33, the corresponding end rollers 30 of the upper and lower rolls 28 of each stand are provided with cooperative seam element forming portions 31, 32, respectively comprising a flange and groove on one roller 30 and a mating ridge on the other.

Figure 4:
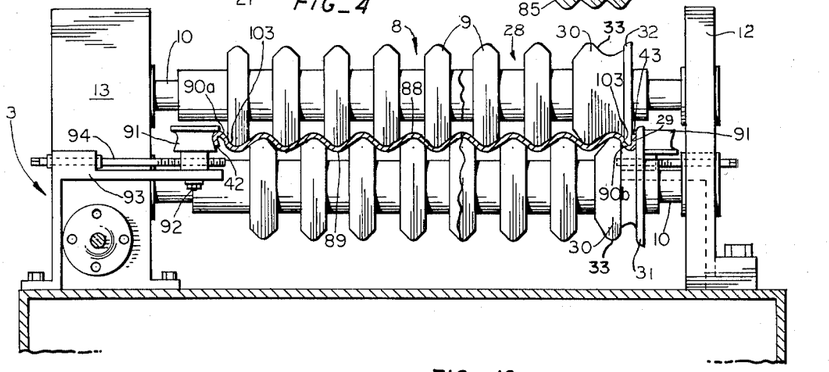
FIG. 4 is an enlarged sectional view as seen from line 4—4 of FIG. 1.

It will be understood that several stands of rolls 28 are preferably provided (FIG. 1) and that the seam element forming portions 31, 32 on the end rollers 30 of each progressively vary in their angularity so as to progressively bend the marginal edge portions of the strip 2 out of the plane of the strip and to substantially right angle flanges 29 (FIG. 4) at the last of said stands. The cooperating pair of end rollers 30 on one end of each stand of rolls 28 are similar in form but reversed in position from the pair of end rollers at the opposite end so that one marginal edge portion of strip 2 is bent into an upwardly directed flange 29 (right side of FIG. 4) and the other is bent downwardly. As illustrated in FIGS. 1 and 4 the flange 29 at edge 42 (hereinafter referred to as the leading edge) extends downwardly and the similar flange at trailing edge 43 extends oppositely (that is, upwardly) out of the plane of strip 2.

The corrugations formed in strip 2 by rolls 8 are of a common form comprising alternating ridges 88 (FIGS. 3, 4) and valleys 89 connected by integral oppositely inclined portions 90. The spacing and depth of the ridges and valleys from the central plane of strip 2 and therefore the inclination of portions 90 is varied as previously described. In such a corrugated strip for the use herein contemplated, lock seam elements 29 are preferably formed generally centrally of oppositely inclined portions at the edges of the strip. In other words, corrugating rollers 9 and end rollers 30 are so arranged that oppositely inclined partial portions 90a and 90b (FIG. 4) occur adjacent the marginal edge portions of the strip and said marginal edge portions are reverse bent back toward their respective adjacent partial inclined portions to form flanges 29.

A pair of spaced, opposed side rollers 91 (FIGS. 1, 2, and 4) are supported on carriage 3 between the last stand of rolls 28 and a succeeding stand of corrugating rolls 8 and are adapted to receive the strip 2 edgewise therebetween. Each roller 91 is supported for rotation on a vertical shaft 92 (FIG. 4) which is mounted for horizontal movement axially of shafts 10 on a bracket 93 secured to carriage 3. The peripheries of rollers 91 are adapted to engage opposite edges of the strip 2 passing through rolls 8, 28, and an adjusting screw 94 connected between each bracket 93 and the corresponding shaft 92 serves to move rollers 91 toward and away from each other to effect such engagement.

The peripheries of rollers 91 are configured to further bend marginal edge portion flanges 29 back on the adjacent partial inclined portions 90a and 90b to finish forming the similar lock seam elements to the preferred shape, as the strip 2 is driven between said rollers. The succeeding stand of corrugating rolls 8 (FIG. 1) assist in keeping the strip from buckling under the edgewise pressure of rollers 91.

Figures 10, 11:
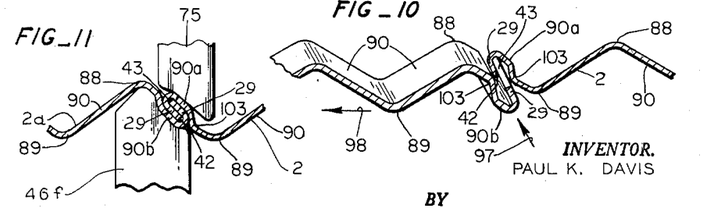
FIG. 10 is a sectional view through a portion of the pipe being formed by the apparatus of this invention as seen generally at line 10—10 of FIG. 7, showing the engagement of the partially formed lock seam elements.
FIG. 11 is a sectional view similar to FIG. 10 at an advanced point as seen generally from line 11—11 of FIG. 7, showing the completion of the formation of the lock seam.

It will be noted in FIG. 10 that in the preferred shape of the lock seam element the marginal edge portion 29 is inclined to a greater degree than the partial inclined portions 90a, 90b adjacent thereto and over which it is bent. Said marginal edge portion and said adjacent inclined portion preferably form an acute angle of approximately 45°.

The machine components thus described at the corrugating station perform the functions of moving the strip 2 longitudinally along a feed path and forming the corrugations and lock seam elements in said strip. If it is desired to employ the method and machine herein described to form plain-walled pipe, the corrugating rolls may be replaced with elongated cylindrical drive rollers frictionally engaging opposite surfaces of a flat strip for moving it through the lock seam forming rolls and outwardly of the output end of carriage 3.

As the strip 2 issues from the output end 19 of carriage 3 it is fed through a forming device 4. Said forming device comprises a main frame 35 supporting a three roll forming mechanism, including a pressure roll 36 (FIGS. 1, 5), a central anvil roll 37, and a guide roll 38, in a position intercepting the feed path of strip 2 from carriage 3. Rolls 37 and 38 are mounted at generally the same horizontal level, respectively, as the lower and upper rolls 8 of the corrugating stands and the lock seam forming stands of rolls 28 so that opposite surfaces of strip 2 are engaged by rolls 38 and 37. Pressure roll 36 is supported on the opposite side of anvil roll 37 from roll 38 remote from carriage 3 and is offset downwardly (FIG. 5) from the feed path represented by the plane of strip 2. Pressure roll 36 is adapted to engage the same surface of strip 2 as roll 38 and therefore functions to curl strip 2 into an arc using anvil roll 37 as a fulcrum as said strip is moved therethrough by the driving means on carriage 3.

Although in the preferred form in curling a corrugated strip rolls 36, 37 and 38 are made up of a plurality of individual wheels, each said roll may be generally considered as a unitary roll having an axis of rotation parallel to a pipe axis 39 (FIGS. 1, 5) about which strip 2 is curled. In the formation of plain-walled pipe, substitute rolls, comparable to rolls 36, 37, 38, comprising elongated, substantially cylindrical rollers supported for rotation about parallel axes intercepting the feed path of a flat strip at an oblique angle may be employed and will similarly function to curl the strip about pipe axis 39. Because of their unique construction (to be described), rolls 36, 37, and 38 appear in plan view (FIG. 1) as spaced, parallel parallelograms and in end view as ellipses (FIG. 5).

Supporting rolls 36, 37, and 38 with their axes at an oblique angle to the feed path of strip 2 causes said strip to be curled by said rolls into helical convolutions, the pitch angle of which is the same as said oblique angle. In order to so support said rolls, an arm 40, rigid with the frame of carriage 3, extends outwardly from the output end 19 thereof and has its outer end swingably mounted about a generally vertical pivot pin 41 (FIG. 5) fixed with respect to the frame 35 of forming device 4. Carriage 3 is therefore supported for swinging relative to frame 35 of forming device 4 about pivot pin 41 which is located so its axis generally intersects the horizontal pipe axis 39. In FIG. 1 it will be noted that pivot pin 41 is substantially directly below the trailing longitudinal side edge 43 of strip 2.

The oblique angle between the feed path of carriage 3 and rolls 36, 37, and 38 may be adjusted in relation to the width of strip 2 at the output end of carriage 3 so that the trailing edge 43 (FIG. 1) of a preceding portion of strip 2, when curled through a convolution of 360° (FIG. 5) is adjacent the leading edge 42 of a following portion of said strip. In this manner, strip 2 is curled into closed helical convolutions and joining such adjacent edges (in a manner to be described) completes a continuous pipe discharged from forming device 4 along pipe axis 33 (FIG. 1).

Figure 5:
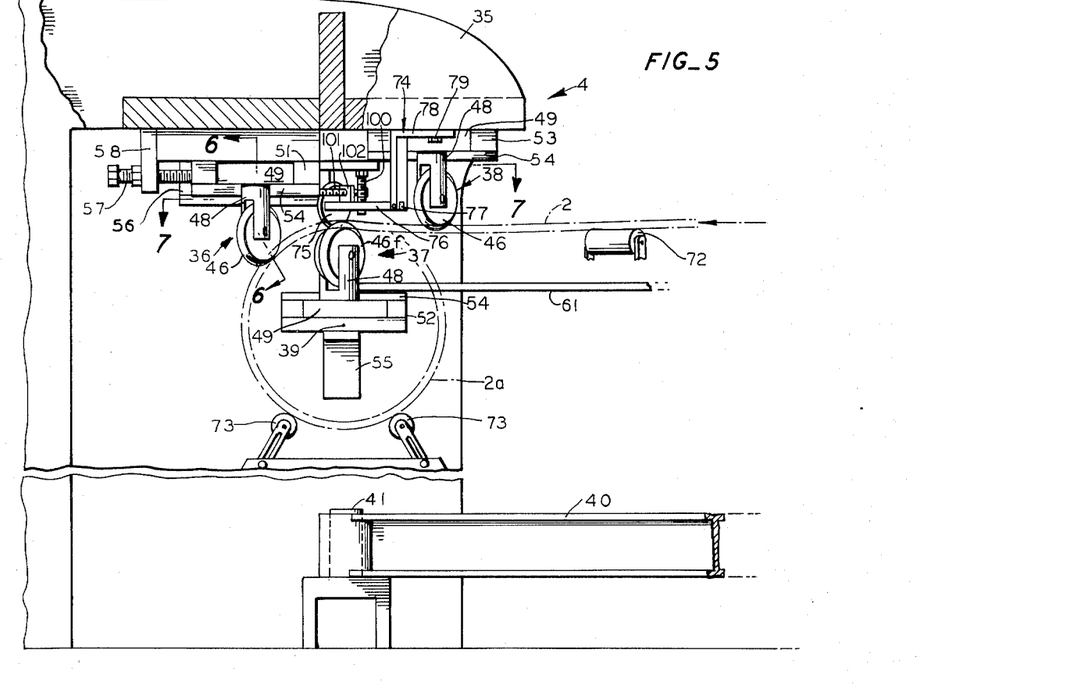
FIG. 5 is an enlarged end elevational view of the pipe forming device of the apparatus of FIGS. 1 and 2.
Figure 6:
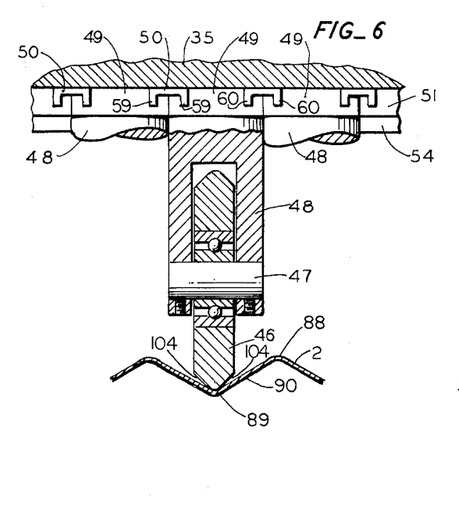
FIG. 6 is a greatly enlarged sectional view as seen generally from line 6—6 of FIG. 5.
Figures 7, 8, 9:
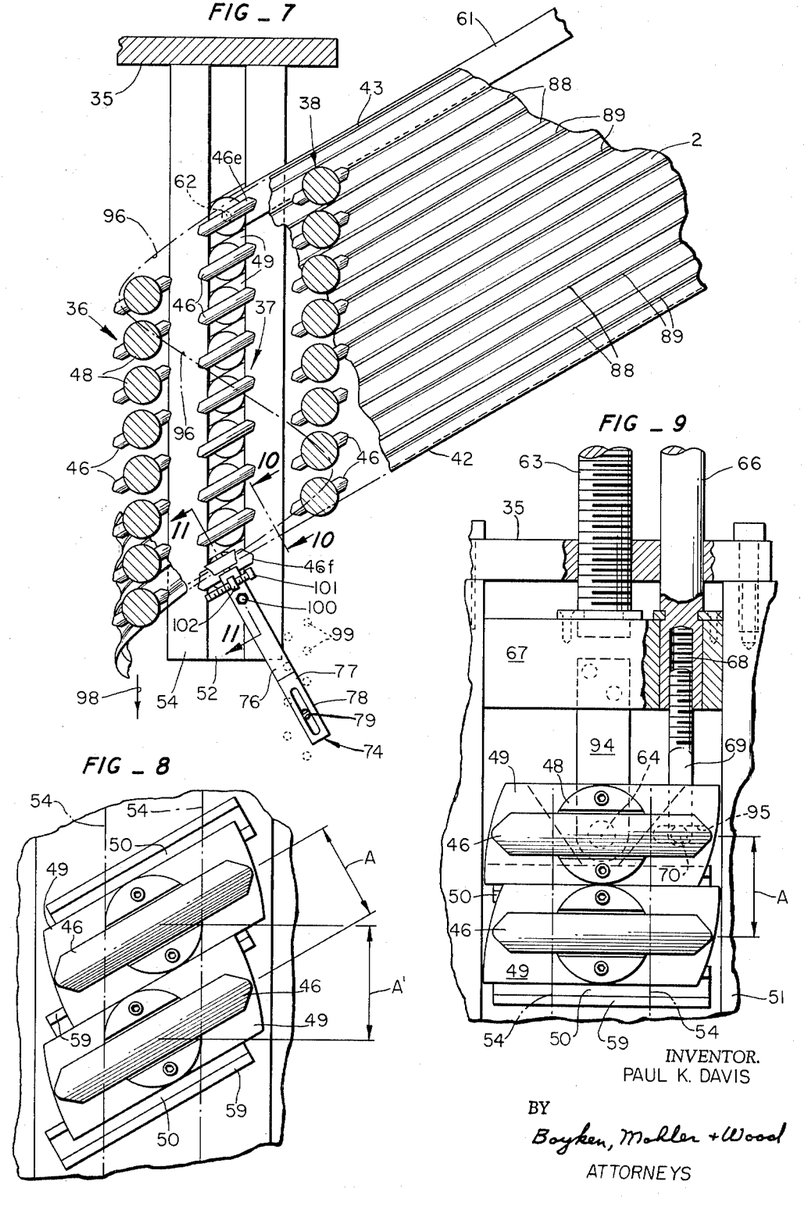
FIG. 7 is a sectional view as seen from line 7—7 of FIG. 5, showing a portion of the strip being formed into the pipe.
FIG. 8 is an enlarged plan view of a pair of forming wheels of one of the forming rolls of FIGS. 5–7.
FIG. 9 is an enlarged plan view, similar to FIG. 8, of the adjusting means for one or more of the forming rolls of FIG. 5.

In curling a corrugated strip 2, and especially into helical convolutions, it is preferable that forming rolls 36, 37, and 38 each comprise a plurality of individually mounted wheels or rollers 46 (FIGS. 5, 7). In each of the forming rolls each wheel 46 has a periphery similar to a corrugating roller 9 and conforming generally to a ridge 88 or valley 89 in the corrugations in strip 2 (FIG. 6) and is supported for rotation on its own shaft 47 mounted in a yoke 48. The periphery of each roller 46 projects from one end of its associated yoke 48, the other end of which is cylindrical and is secured to transverse individual mounting plate 49. Each plate 49 has opposed parallel side edges in engagement with adjacent mounting plates thereby maintaining the planes of the peripheries of rollers 46 parallel and spaced apart. The shortest distance A (FIGS. 8, 9) between the planes of rollers 46 is equal to the distance between adjacent ridges or valleys of the corrugations of strip 2. The adjacent side edges of plates 49 are connected for being held in sliding engagement by any suitable means, such as the C-section connectors 50 (FIGS. 6, 8, 9) which have their legs 59 slidably received in grooves 60 in adjacent plates 49.

The slidably connected plates 49 carrying wheels 46 of forming rolls 36, 37 and 38 are respectively mounted as groups for sliding in ways 51, 52 and 53. Said ways are similar in construction and are provided with oppositely inwardly extending lips 54 (FIGS. 5, 7) extending over the ends of plates 49 and connectors 50 and slidably engaging opposite sides of the cylindrical bases of yokes 48 for retaining the same for sliding longitudinally of the ways.

Way 53 is secured to frame 35 (FIG. 5) for positioning the rollers 46 of guide roll 38 adjacent the output end of carriage 3 and with rollers 46 aligned with the valleys of the corrugations in strip 2 issuing from said carriage for engaging the same. Way 52 is supported on a bracket 55 fixed to frame 35 and positioning the rollers 46 of anvil roll 37 to engage the underside of the ridges in strip 2 at a location more remote from carriage 3 than roll 38. Way 51 is supported at its ends for movement toward and away from way 53 in a pair of end ways 56 (FIG. 5) in a position to engage the rollers 46 of pressure roll 36 with the valleys in the corrugations of strip 2 on the same surface as is engaged by roll 38. It will also be noted that pressure roll 36 is mounted with its axis closer to pipe axis 39 than is the axis of guide roll 38.

Way 51 carrying pressure roll 36 may be slidably adjusted along ways 56 by screws 57 (FIGS. 1, 5) which are connected to way 51 and threaded through a fixed bracket 58 mounted on frame 35. In this manner pressure roll 36 may be moved closer to or farther away from anvil roll 37 so as to curl sheet 2 to an arc of lesser or greater radius for forming a smaller or larger pipe.

Both for the purpose of maintaining control of the material of strip 2 during the curling process and for preventing undue flattening of the corrugations therein, it is desirable that the rollers 46 of each of the forming rolls engage the respective ridges and valleys of the corrugations centrally thereof and have their peripheries aligned with planes normal to the corrugations at the points of engagement between the rollers and the ridges and the valleys. It is obvious that the cross section of the periphery of a roller 46 may be either convex (as shown) for being received centrally of a valley 89 (or the undersurface of a ridge 88) or concave for receiving a ridge therein. As the oblique angle between the longitudinal strip axis or feed path of carriage 3 and the pipe axis 39 is varied to form helical convolutions of different pitches, it will be seen that the angle between the planes of the peripheries of rollers 46 and pipe axis 39 must likewise vary. In addition, as such angle changes, forming rolls 36 and 38 must be translated or shifted in a direction parallel to said pipe axis so that their rollers 46 will properly engage the ridges and valleys in the strip 2. Anvil roll 37 need not be so translated since its end roller 46e (FIG. 7) is generally aligned with the axis of pivot pin 41 (FIG. 1) about which the strip axis or feed path changes in relation to the pipe axis, as is the edge 43 of strip 2.

End roller 46e of roll 37 may have its yoke 48 rigidly connected to an arm 61 (FIG. 7) which extends toward and is connected to carriage 3 (FIG. 2). End roller 46e and its mounting structure are pivoted to way 52 by a pin 62 (FIG. 7) in vertical alignment with pivot 41. Relative angular displacement between carriage 3 and forming device frame 35 about the axis of pivot pin 41 also causes the same angular displacement of arm 61 about the aligned axis of pin 62, thereby maintaining the plane of roller 46e parallel to the strip axis or feed path of carriage 3. Since mounting plates 49 and connectors 50 keep all the rollers of each roll in parallel, spaced relation, whatever the oblique angle between the feed path from carriage 3 and the pipe axis 39 the same angle will be maintained between the planes of the peripheries of rollers 46 and said pipe axis.

It will be noted that as the angle between the path along which a corrugated strip 2 is fed and the pipe axis is changed, the spacing between adjacent ridges or adjacent valleys of said strip along a line parallel to said pipe axis changes proportionally. The mounting means for rollers 46 is so constructed that the shortest distance A (FIG. 9) between any two corresponding points on an adjacent pair of rollers 46 corresponds to the spacing between the ridges or valleys normal to the longitudinal axis of the corrugated strip and such distance is maintained as the wheels 46 are angularly displaced (FIG. 8). Since ways 51, 52, and 53 constrain the rollers of each roll 36, 37, and 38 to move only in linear paths parallel to pipe axis 39, the yoke and plate mounts 48–49 maintain the spacing, A', between rollers 46 of each roll along such linear path at the same proportion, i.e., related to the sine of the oblique angle between the strip axis or feed path and the pipe axis. In this manner, not only is roller 46e of roll 37 aligned to engage the under surface of the marginal ridge adjacent edge 43 of strip 2, but all other rollers of roll 37 are maintained in alignment to engage the under surfaces of the other ridges in the strip at a plurality of points extending in a line parallel to the pipe axis.

Since said strip follows essentially a straight path between roll 37 and roll 38 (FIG. 5), the latter may be connected by a pin-and-slot connection to an arm similar to arm 61. For example, connecting the mount for the end roller 46 of roll 38 to arm 61 (or to another similar arm secured to carriage 3 and pivoted about an axis aligned with pivot pins 41 and 62) at the intersection of such arm and roll 38 (FIG. 7), causes the same angular displacement and proportional spacing of the rollers 46 of roll 38. In addition, angular displacement of arm 61 or such other similar arm causes the so connected group of rollers 46 comprising roll 38 to be shifted as a unit along the linear path axially of said roll into proper alignment for engaging the upper surface of the strip 2 centrally of the valleys thereof at a plurality of points extending in a line parallel to pipe axis 39.

If desired an arrangement such as shown in FIG. 9 may be employed to axially shift and change the angularity of the rollers 46 of rolls 36 and 38. An adjustment screw 63 may be threaded through frame 35 and connected to a block 67 having a projecting finger 94 pivotally connected at its inner end by pin 64 centrally of the end mounting plate 49 or roll 36 or roll 38. Screw 63 may be turned by hand or by other means causing all of the connected plates 49 to shift transversely of frame 35 along the linear path to which they are confined by their respective ways 51 or 53.

A rod 66 (FIG. 9) journalled for rotation in block 67 is provided at its inner end with an internally threaded bore 68. Bore 68 threadedly receives the end of a screw 69 which is provided with a pin 70 received in an elongated slot 95 in the end mounting plate 49 at a point offset from pivot pin 64. Turning rod 66 by hand or other means causes screw 69 to swing plate 49 (and all its connected mounting plates) about pivot pin 64 thereby changing the angle of rollers 46 of forming roll 36 or 38 with respect to pipe axis 39. Because of the engagement of the parallel side edges of mounting plates 49 the proper spacing is maintained between rollers 46 no matter what their angular displacement, as previously described. The connection employing pins 64 and 70 and slot 95 may be used to connect end mounting plate 49 of roll 38 to arm 61 for effecting such shifting and angular displacement of the rollers of said roll by direct connection to carriage 3.

Because of the fact that pressure roll 36 engages strip 2 on a helically curved portion thereof said roll is axially displaced with rollers 46 thereof out of alignment with rollers 46 of roll 38 (FIG. 7) so that the planes of the peripheries of the former are properly aligned with the planes bisecting the valleys of the corrugations at the line of points of engagement of pressure roll 36. Although the peripheries of all rollers 46 generally conform to the cross sectional shape of the ridges or valleys formed in the strip, it is preferable in the case of roll 36 that such rollers be relieved, as at 104 (FIG. 6) from exact conformity so that they do not tend to ride up the inclined portions 90 of the corrugations.

It will be understood that various other means may be used to mount the rollers 46 of rolls 36, 37, and 38 for the movement described. It is the function and purpose of such mounting means to position rollers 46 so that they provide a plurality of points of support for strip 2 during curling thereof into helical convolutions and function as guide elements to maintain control of said strip.

Anvil roll 37 provides a plurality of such points of support extending along a first line parallel to the pipe axis where the rollers of said roll engage the strip inside the convolutions being formed. Pressure roll 36 provides a second plurality of such points of support extending along a second, spaced, parallel line where rollers 46 of roll 36 engage the outside surface of the convolution.

By arranging such points at the ridges and valleys of a corrugated strip and applying the supporting forces through guide elements, such as rollers 46, which generally conform to the ridges 88 and valleys 89, a high degree of control over the strip is accomplished. Not only do rollers 46 apply radial supporting forces to the convolutions into which the strip is formed but they also apply axial guiding forces to the inclined portions 90 adjacent ridges 88 and valleys 89 to maintain the strip in its proper path. Due to the guiding effect of the projection of the rollers into the ridges and valleys of the strip the trailing edge 43 of a formed convolution is maintained adjacent the leading edge 42 of the unformed strip and undue axial wandering of said edges is prevented.

Strip 2 is preferably driven through the rolls of forming device 4 by the powered stands of corrugating rolls 8 and lock seam forming rolls 28 or other suitable driving means. A cylindrical bridging roller 72 (FIGS. 1, 5) may be supported for rotation extending transversely under strip 2 at the output end of carriage 3 for providing additional support and control for said strip. It will be noted that guide roll 38 (FIG. 5) is offset downwardly slightly from the path of strip 2 so as to urge said strip against roller 72 and assist in preventing its buckling between carriage 3 and forming device 4. A pair of spaced, adjustable rollers 73 may be mounted below forming rolls 36, 38 in locations to engage the outer periphery of the helically convoluted strip so as to prevent it from spreading and assuring the meeting of the edge portions of the strip.

As previously mentioned, the stands of lock seam forming rolls 28 form marginal edge flanges or hooks 29 at the leading edge 42 and the trailing edge 43 of strip 2 (FIGS. 1, 4, 10). As strip 2 is driven through forming rolls 36–38 the trailing edge 43 (which has flange 29 projecting upwardly) travels in a helical path denoted by dot-dash line 96 in FIG. 7 from the end of anvil roll 37 adjacent roller 46e to emerge adjacent the other end of said roll (at roller 46f) and the leading edge 42 of strip 2. Said leading edge has its flange or hook 29 turned downwardly and immediately preceding their passage over roller 46f of anvil roll 37, the two flanges are hooked one over the other (FIG. 10). The pitch of the helical convolution into which strip 2 is curled is maintained as aforesaid such that the upturned flange or lock seam element 29 on the trailing edge 43 of a preceding convolution 2a of the strip (FIG. 10) is engaged under and behind the downturned flange or lock seam element 29 at the leading edge 42 of a following, straight portion of strip 2. Immediately subsequent to such engagement both edges and the engaged lock seam elements pass over the end roller 46f (FIGS. 7, 11) of anvil roll 37.

Engagement of said seam elements 29 is facilitated by the manner in which they are formed. It will be noted that trailing edge 43 upon being curled through nearly 360° not only approaches leading edge 42 from beneath the latter (FIG. 5) but also in a horizontaly converging path (FIG. 7). In other words, the upwardly (or radially outwardly) directed flange 29 on edge 43 is inserted into engagement with the downwardly (or radially inwardly) opening groove behind flange 29 on edge 42 in the direction of arrow 97 (FIG. 10), i.e., along a path extending upwardly (toward incoming strip 2) and inclined slightly in the direction of movement of the pipe (arrows 98, FIGS. 1, 7, 11) discharging along pipe axis 39. (Of course, the flange 29 on edge 42 is at the same time being received in engagement with the groove behind flange 29 on edge 43.)

The inclination of such path of interengagement of the lock seam elements is preferably approximately the same as the inclination to which the flange elements 29 have been formed with respect to the plane of strip 2 (or pipe axis 39). In this manner the seam elements readily and automatically fully engage each other at the point of intersection of the convolution with the incoming strip (over roller 46f of roll 37) by following their respective natural paths. It is unnecessary to forcibly displace either edge 42 of the strip 2 or edge 43 of the convolution 2a, and thereby unduly stress the same, in order for the lock seam elements to be properly engaged.

In a corrugated strip where the lock seam elements are formed, as illustrated, at the partial inclined portions 90a, 90b the flanges 29 are inherently properly inclined for interengagement (FIG. 10).

Where marginal edge flanges, such as 29, are each bent back to an acute angle with respect to an adjacent portion of a flat strip (or at the apex of a ridge or valley of a corrugated strip) that is not naturally inclined to the pipe axis, it may be desirable to incline such adjacent portions prior to engagement (with auxiliary rollers or the like) so such flanges are directed for easier interengagement in the direction of arrow 97 (FIG. 10). Plain-walled pipe or helically corrugated pipe in which the lock seam is formed at other than the inclined portions between the ridges and valleys may thereby be formed by the method and apparatus of this invention modified in the above respect.

The slight offset of roll 38 (FIG. 5) depresses strip 2 toward the convolution 2a thereby initiating the interengagement of the lock seam elements at a slightly greater distance from roller 46f.

Supported immediately above roller 46f by a bracket 74 mounted on frame 35 is a crimping wheel 75 (FIGS. 5, 7). Said crimping wheel is supported for rotation with its periphery spaced from the periphery of roller 46f a distance of approximately four thicknesses of strip 2 which is substantially the thickness of a completed lock seam. Wheel 75 is rotatably mounted on one end of leg 76 of bracket 74, the other end being hinged at 77 to the downwardly depending leg of inverted-L-shaped member 78. The upper, horizontal leg of member 78 may be slotted for securement to a horizontally extending portion of frame 35 by a bolt 79 received through said slot and threaded in any one of a plurality of holes 99 (FIG. 7) in said frame portion.

In order to properly position wheel 75 with respect to roller 46f, bracket 74 may be secured in various locations and extending at various angles by means of bolt 79, the slot in member 78, and holes 99. A vertically extending bolt 100 threadedly received in leg 76 and abutting a fixed, horizontally extending portion of frame 35 holds wheel 75 at the proper spacing with respect to roller 46f.

As the interengaged seam elements are moved over roll 37, crimping wheel 75, in cooperation with roller 46f, further bends the engaged inclined portions 90a and 90b (FIG. 11) to positions parallel therewith to thereby complete the formation of a tightly engaged lock seam.

A horizontally extending bolt 101 threaded through an ear 102 on leg 76 abuts a vertically extending portion of frame 35 (or the side of way 51) (FIG. 7) to prevent wheel 75 from moving with strip 2 as the same is driven between said wheel and roller 46f. In this manner wheel 75 applies pressure to the engaged lock seam elements, including marginal edge flanges 29 and adjacent partial inclined portions 90a and 90b (FIG. 11) at a point on end roller 46f generally aligned with the points of engagement of the other rollers 46 of roll 37 and strip 2 (FIG. 7).

It is preferable that the finished or completed lock seam (FIG. 11), comprising four overlapped thicknesses of the material of strip 2, be arranged generally centrally of an inclined portion of the corrugations in the strip and for this purpose partial inclined portions 90a and 90b may be offset, as at 103 (FIGS. 10, 11). Rollers 30 (FIG. 4), wheel 75, and roller 46f (FIG. 11) may be peripherally configured so as to form and accommodate such offset.

The formation of similarly shaped lock seam elements at opposite edges of the strip has the advantage of requiring the application of equal forces to both edges in forming the elements and closing or completing the seam therefrom. Hence, strip 2 is subjected to equal deformation at its edges and no unequally distributed stresses are induced in it.

In addition, it is preferable that the lock seam elements are formed to a shape as near to their closed or completed shape as possible prior to curling the strip, leaving such elements open only to the extent necessary to be properly interengaged. When such nearly closed elements are received, one within the other as described, the force thereafter necessary to close them and complete the seam is minimal and may be applied in a single pass between the crimping wheel 75 and roller 46f. Due to the small deformation required to accomplish complete closing of the lock seam little stress is induced in the completed pipe by this method. It will be understood that the completion or crimping of the lock seam between the adjacent edges of strip 2 is accomplished in a continuous manner as is the curling of said strip into helical convolutions. If desired, various caulking materials, such as rubber, plastic, solder, or the like, may be introduced adjacent the lock seam elements 29 during formation and completion of the lock seam to render it completely leakproof.

In a corrugated metal strip a line at the midpoint between a ridge and its adjacent valley on the inclined portion is known as the "neutral axis" of the corrugation and is assumed to be substantially free of stress when the strip is carrying a load. Forming the connection or seam between adjacent edges of the strip and a preceding helical convolution thereof at such neutral axis is preferred because such seam or connection is not normally subjected to substantial stresses. In pipe formed of connected helical convolutions the connection between such convolutions, whether welded or lock seamed, is likely to be weaker than the uninterrupted wall of the pipe between connections. Connecting two partial inclined portions together intermediate a ridge and valley, as disclosed herein, to form a composite single inclined portion has the advantage of locating the connection in an area of the pipe wall where it will not be stressed in normal usage of the pipe.

Although in the embodiments herein disclosed strip 2 has been curled downwardly to form the pipe, it will be understood that forming device 4 may be inverted, if desired, so as to curl said strip upwardly. Such inversion, for example, facilitates forming larger sizes of pipe without requiring raising of the corrugating stands on carriage 3. The designations "upwardly" and "downwardly" hereinbefore used therefore more properly relate to the direction in which the strip 2 is being bent. It will also be obvious that lock seams other than the one specifically disclosed herein may be employed to connect the adjacent side edges of the strip from which the helical convolutions are formed.

In the specific embodiment herein disclosed the pressure roll 36 is adjustable for forming different sizes of pipe because it is desired to maintain the anvil and guide rolls 37 and 38 generally aligned with the corrugating rolls 8. It will be understood, however, that the relationship between the three forming rolls determines the radius about which the strip is curled and that others of the rolls may be adjusted if desired. It has been found that the relationship between the rolls also varies somewhat with the gauge or thickness of strip 2 because of the increased pressure necessary to form a heavier gauge strip. Generally, the pipe axis 39 lies in the same vertical plane as the axis of anvil roll 37, but in the smallest sizes of pipe of approximately six-inch diameter said pipe axis may tend to shift slightly toward carriage 3.

It is necessary that at least the pressure roll 36 and the anvil roll 37, and preferably also the guide roll 38, are parallel (or arranged to engage the strip along lines that are parallel) to each other so that the strip is curled in a cylindrical path all radii of which are equidistant from the pipe axis 39 and which, therefore, intersects the feed path of the incoming strip (FIG. 5). The relative position of pressure roll 36 predetermines the radius of such path independently of other factors. The oblique angle at which the strip is fed into the forming rolls and the width of the strip are the two other factors which are so related to each other by the apparatus and method of this invention as to guide the curled trailing edge of the strip through a 360° helical path at such predetermined radius into proper joining relation with the leading edge of the incoming strip.

The detailed description and illustration of certain embodiments herein shall not be taken as restrictive, since modifications that would occur to one skilled in the art are intended to come within the spirit and scope of the invention.

I claim:

1. A method for forming pipe from an elongated strip of sheet metal having a pair of generally parallel longitudinal side edges, comprising: forming the marginal edge portions of said strip in opposite directions transversely of the plane of said strip into similar flanges extending oppositely inwardly over portions of said strip adjacent said marginal edge portions with each of the latter extending at a first angle of approximately 45° with respect to said adjacent portions, curling said strip out of its plane into helical convolutions about a pipe axis extending at an oblique angle with respect to the longitudinal axis of said strip and in a plane spaced from and generally parallel to the plane of said strip, disposing said adjacent portions and said flanges so that said flanges extend at a second angle substantially greater than said first angle but less than 90° with respect to said pipe axis, interengaging one of the flanges on a preceding portion of said strip behind the other flange on a following portion of said strip immediately prior to the intersection of said convolution with the plane of said strip with said flanges so disposed, and further forming said engaged flanges to positions generally parallel with said adjacent portions substantially at the point of intersection of said convolutions with the plane of said strip.

2. A method for forming corrugated sheet metal pipe from an elongated, flat strip of sheet metal having a pair of generally parallel, opposite side edges, comprising: forming across the width of said strip a plurality of spaced, parallel corrugations extending longitudinally of said strip, said corrugations being so formed as to include alternating ridges and valleys connected by oppositely inclined portions with a ridge adjacent one side edge of said strip and a valley adjacent the other side edge of said strip defining oppositely inclined partial inclined portions adjacent said opposite side edges, supporting said strip by rolling engagement therewith at a plurality of points on a line extending at an oblique angle to the longitudinal axis of said strip, curling said strip from said line of points into adjacent helical convolutions about a pipe axis extending generally parallel to said line, and connecting one side edge of each convolution to the opposite side edge of said strip to form a single inclined portion from said partial inclined portions.

3. A method for forming corrugated sheet metal pipe from an elongated, flat strip of sheet metal having a pair of generally parallel, opposite side edges, comprising: forming across the width of said strip a plurality of spaced, parallel corrugations extending longitudinally of said strip, said corrugations being so formed as to include alternating ridges and valleys connected by oppositely inclined portions with a ridge adjacent one side edge of said strip and a valley adjacent the other side edge of said strip defining oppositely inclined partial inclined portions adjacent the opposite marginal edge portions of said strip, forming similar, opposed lock seam elements by reverse bending each of said marginal edge portions back toward its adjacent partial inclined portion past a position normal to the plane of said strip, supporting said strip at a plurality of points along a line extending at an oblique angle to the longitudinal axis of said strip, curling said strip into adjacent helical convolutions about a pipe axis extending generally parallel to said line, interengaging said lock seam elements as each said convolution is so curled, and flattening said engaged elements at said line by further bending said marginal edge portions to substantially the same inclination as said adjacent partial inclined portions.

4. The method of forming corrugated sheet metal pipe, comprising: forming a plurality of longitudinally extending alternating ridges and valleys across the width of an elongated strip of sheet metal with one ridge spaced from one side edge of said strip and one valley equally spaced from the other side edge, partially forming similar oppositely projecting elements of a sheet metal lock seam along the side edges of said strip respectively extending equally outwardly from said one ridge and said one valley, curling said strip at an oblique angle with respect to its longitudinal axis into helical convolutions with one side edge of a following portion of said strip adjacent the other side edge of a preceding, curled portion of said strip, and at the same time engaging said lock seam elements and completing the forming therefrom of a lock seam connecting said adjacent edges, said lock seam thereby being formed equidistant between said one ridge and said one valley.

5. A method of forming pipe from a strip of longitudinally corrugated sheet metal, comprising: advancing said strip longitudinally supporting said strip by rolling engagement at a plurality of points along a line extending at an oblique angle with respect to the longitudinal axis of said strip with at least one of said points aligned with a corrugation in said strip, curling said strip into helical convolutions about a pipe axis substantially parallel to said line, maintaining the trailing edge of each said convolution adjacent the leading and opposite edge of said strip immediately preceding said curling by applying pressure at said one point to said corrugation axially of said convolution, and continuously connecting said adjacent edges into a helical seam.

6. In a method of forming pipe from an elongated strip of longitudinally corrugated sheet metal, comprising: continuously advancing said strip longitudinally past a forming station, curling said strip at said station into helical convolutions about a pipe axis extending at an oblique angle with respect to the longitudinal axis of said strip, supporting said strip during said curling by rolling engagement at a first plurality of spaced points inside said convolutions and at a second plurality of spaced points outside said convolutions, said pluralities of points being respectively aligned along spaced first and second lines extending in parallel spaced relation to said pipe axis, and said points being respectively aligned with the ridges and valleys of the corrugations in said strip for maintaining the trailing edge of each said convolution adjacent the leading and opposite edge of said strip immediately preceding said curling for connecting said adjacent edges.

7. In a method of forming pipe from an elongated strip of longitudinally corrugated sheet metal, comprising: continuously advancing said strip longitudinally past a forming station, curling said strip at said station into helical convolutions about a pipe axis extending at an oblique angle with respect to the longitudinal axis of said strip, supporting said strip during said curling by rolling engagement at a first plurality of spaced points inside said convolutions and at a second plurality of spaced points outside said convolutions, said pluralities of points being respectively aligned along spaced first and second lines extending in parallel spaced relation to said pipe axis, and said points being respectively aligned with the ridges and valleys of the corrugations in said strip for maintaining the trailing edge of each said convolution adjacent the leading and opposite edge of said strip immediately preceding said curling for connecting said adjacent edges, and changing said angle, the spacing between said first and second lines and the spacing between said points along said lines by predetermined related amounts to effect a change in the diameter of said convolutions.

8. A method of forming pipe from an elongated strip of longitudinally corrugated sheet metal having partial lock seam elements along the opposite side edges thereof, comprising: continuously advancing said strip longitudinally past a forming station, curling said strip at said station into helical convolutions about a pipe axis extending at an oblique angle with respect to the longitudinal axis of said strip, supporting said strip during said curling by rolling engagement at a first plurality of spaced points inside said convolutions and at a second plurality of spaced points outside said convolutions, said pluralities of points being respectively aligned along spaced first and second lines extending in parallel spaced relation to said pipe axis, and said points being respectively aligned with the ridges and valleys of the corrugations in said strip for maintaining the trailing edge of each said convolution adjacent the leading and opposite edge of said strip immediately preceding said curling, interengaging said elements on said adjacent edges, and immediately thereafter completing the forming of a continuous lock seam from said elements at said one line.

9. Apparatus for forming corrugated sheet metal pipe from an elongated strip of sheet metal, comprising: a generally horizontally extending carriage having an input and an output end, a plurality of corrugating rolls mounted on said carriage, driving means for advancing said strip longitudinally from said input end to and past said output end through said corrugating rolls for forming longitudinally extending ridges and valleys in said strip, a plurality of horizontally extending, spaced, parallel forming rolls, frame means supporting said forming rolls adjacent said output end of said carriage and extending at an oblique angle with respect to the longitudinal axis of said strip for receiving said strip therebetween, at least one of said forming rolls being vertically offset from another of said forming rolls for curling said strip into helical convolutions about a pipe axis parallel to said forming rolls, means mounting said carriage and said frame means for relative swinging about a generally vertical axis substantially intersecting said pipe axis for changing said angle and thereby changing the pitch of said convolutions, at least one of said forming rolls including a plurality of guide elements spaced apart along said one forming roll in a direction parallel to said pipe axis for engaging said valleys of said strip, and means supporting said guide elements for movement toward and away from each other in said direction for changing the spacing between said elements in said direction as said angle is changed.

10. Apparatus for forming corrugated sheet metal pipe from an elongated strip of sheet metal, comprising: a generally horizontally extending carriage having an input and an output end, a plurality of corrugating rolls mounted on said carriage, driving means for advancing said strip longitudinally from said input end to and past said output end through said corrugating rolls for forming longitudinally extending ridges and valleys in said strip, a plurality of horizontally extending, spaced, parallel forming rolls, frame means supporting said forming rolls adjacent said output end of said carriage and extending at an oblique angle with respect to the longitudinal axis of said strip for receiving said strip therebetween, at least one of said forming rolls being vertically offset from another of said forming rolls for curling said strip into helical convolutions about a pipe axis parallel to said forming rolls, means mounting said carriage and said frame means for relative swinging about a generally vertical axis substantially intersecting said pipe axis for changing said angle and thereby changing the pitch of said convolutions, at least one of said forming rolls including a plurality of guide elements spaced apart along said one forming roll in a direction parallel to said pipe axis for engaging said valleys of said strip, and means supporting said guide elements for movement toward and away from each other in said direction for changing the spacing between said elements in said direction as said angle is changed, and means supporting one of said forming rolls for movement toward and away from another of said forming rolls for changing the diameter of said convolutions.

11. Apparatus for forming corrugated sheet metal pipe from an elongated strip of sheet metal, comprising: a generally horizontally extending carriage having an input and an output end, a plurality of corrugating rolls mounted on said carriage driving means for advancing said strip longitudinally from said input end to and past said output end through said corrugating rolls for forming longitudinally extending ridges and valleys in said strip, a plurality of horizontally extending, spaced, parallel forming rolls, frame means supporting said forming rolls adjacent said output end of said carriage and extending at an oblique angle with respect to the longitudinal axis of said strip for receiving said strip therebetween, at least one of said forming rolls being vertically offset from another of said forming rolls for curling said strip into helical convolutions about a pipe axis parallel to said forming rolls, means mounting said carriage and said frame means for relative swinging about a generally vertical axis substantially intersecting said pipe axis for changing said angle and thereby changing the pitch of said convolutions, at least one of said forming rolls including a plurality of guide elements spaced apart along said one forming roll in a direction parallel to said pipe axis for engaging said valleys of said strip, and means supporting said guide elements for movement toward and away from each other in said direction for changing the spacing between said elements in said direction as said angle is changed, and means supporting one of said forming rolls for movement toward and away from another of said forming rolls for changing the diameter of said convolutions, said angle being changed an amount bearing a predetermined relation to said diameter and the width of said strip as received at said forming rolls.

12. A machine for forming pipe from an elongated strip of sheet metal, comprising: a feed carriage having driving means thereof for advancing said strip longitudinall along a generally planar feed path, means arranged on opposite sides of said path for partially forming similar, opposed lock seam elements along the opposite longitudinal side edges of said strip, a three-roll forming means including first, second, and third elongated forming rolls, frame means supporting said rolls in positions intercepting said feed path for receiving said strip therebetween from said carriage, said first roll being engageable with one surface of said strip along a first line of points, said second roll being engageable with the other surface of said strip along a second line of points, and said third roll being engageable with said one surface of said strip along a third line of points parallel to and spaced from said second line, said third roll being supported with said third line offset from the plane of said feed path for curling said strip between said second and third lines into a curved path, all radii of which are equidistant from a pipe axis parallel to said second and third lines, intersecting said feed path at said second line, means supporting said carriage and said frame means with said second and third lines extending at an oblique angle with respect to the longitudinal axis of said strip in said feed path whereby said curved path is in the form of a helical convolution, said angle being so related to the radius of said curved path and the width of said strip between said lock seam elements that the said element on the trailing edge of a preceding portion of said strip in said curved path converges into interengagement with the said element on the leading edge of a following portion of said strip in said feed path between said first and second lines, and seam completing means supported to engage said interengaged elements substantially at said second line for completing the formation of a lock seam therefrom.

13. A machine for forming pipe from an elongated strip of sheet metal having longitudinally extending alternate ridges and valleys therein, comprising: a feed carriage having driving means thereon for advancing said strip longitudinally along a generally planar feed path, means arranged on opposite sides of said path for partially forming similar, opposed lock seam elements along the opposite longitudinal side edges of said strip, a three-roll forming means including first, second, and third elongated forming rolls, frame means supporting said rolls in positions intercepting said feed path for receiving said strip therebetween from said carriage, said first roll being engageable with one surface of said strip along a first line of points, said second roll being engageable with the other surface of said strip along a second line of points, and said third roll being engageable with said one surface of said strip along a third line of points parallel to and spaced from said second line, said third roll being supported with said third line offset from the plane of said feed path of curling said strip between said second and third lines into a curved path, all radii of which are equidistant from a pipe axis parallel to said second and third lines, intersecting said feed path at said second line, means supporting said carriage and said frame means with said second and third lines extending at an oblique angle with respect to the longitudinal axis of said strip in said feed path whereby said curved path is in the form of a helical convolution, said angle being so related to the radius of said curved path and the width of said strip between said lock seam elements that the said element on the trailing edge of a preceding portion of said strip in said curved path converges into interengagement with the said element on the leading edge of a following portion of said strip in said feed path between said first and second lines, and seam completing means supported to engage said interengaged elements substantially at said second line for completing the formation of a lock seam therefrom, at least said second and third rolls including a plurality of rollers and supports therefor supporting said rollers respectively aligned along said second and third lines and spaced to engage said strip with the peripheries of said rollers respectively centrally of said ridges and valleys.

14. A machine for forming pipe from an elongated strip of sheet metal having longitudinally extending alternate ridges and valleys therein, comprising: a feed carriage having driving means thereon for advancing said strip longitudinally along a generally planar feed path, means arranged on opposite sides of said path for partially forming similar, opposed lock seam elements along the opposite longitudinal side edges of said strip, a three-roll forming means including first, second, and third elongated forming rolls, frame means supporting said rolls in positions intercepting said feed path for receiving said strip therebetween from said carriage, said first roll being engageable with one surface of said strip along a first line of points, said second roll being engageable with the other surface of said strip along a second line of points, and said third roll being engageable with said one surface of said strip along a third line of points parallel to and spaced from said second line, said third roll being supported with said third line offset from the plane of said feed path for curling said strip between said second and third lines into a curved path, all radii of which are equidistant from a pipe axis parallel to said second and third lines, intersecting said feed path at said second line, means supporting said carriage and said frame means with said second and third lines extending at an oblique angle with respect to the longitudinal axis of said strip in said feed path whereby said curved path is in the form of a helical convolution, said angle being so related to the radius of said curved path and the width of said strip between said lock seam elements that the said element on the trailing edge of a preceding portion of said strip in said curved path converges into interengagement with the said element on the leading edge of a following portion of said strip in said feed path between said first and second lines, and seam completing means supported to engage said interengaged elements substantially at said second line for completing the formation of a lock seam therefrom, at least said second and third rolls including a plurality of rollers and supports therefor supporting said rollers respectively aligned along said second and third lines and spaced to engage said strip with the peripheries of said rollers respectively centrally of said ridges and valleys, said seam completing means including a wheel spaced from one of the rollers of said second roll a distance substantially equal to the thickness of a completed lock seam for urging said interengaged seam elements against said one roller.

15. Apparatus for forming corrugated sheet metal pipe from an elongated strip of sheet metal, comprising: a generally horizontally extending carriage having an input and an output end, a plurality of corrugating rolls mounted on said carriage, driving means for advancing said strip longitudinally from said input end to and past said output end through said corrugating rolls for forming longitudinally extending ridges and valleys in said strip, a plurality of horizontally extending, spaced parallel forming rolls, frame means supporting said forming rolls adjacent said output end of said carriage and extending at an oblique angle with respect to the longitudinal axis of said strip for receiving said strip therebetween, at least one of said forming rolls being vertically offset from another of said forming rolls for curling said strip into helical convolutions about a pipe axis parallel to said forming rolls, means mounting said carriage and said frame means for relative swinging about a generally vertical axis substantially intersecting said pipe axis for changing said angle and thereby changing the pitch of said convolutions, at least one of said forming rolls including a plurality of guide elements spaced apart along said one forming roll in a direction parallel to said pipe axis for engaging said valleys of said strip, and means supporting said guide elements for movement toward and away from each other in said direction for changing the spacing between said elements in said direction as said angle is changed, said guide elements being rollers supported for rotation in parallel planes, connecting means connecting said last mentioned means to said carriage for maintaining the planes of said rollers parallel to the longitudinal axis of said strip.

16. A forming roll for use in curling an elongated strip of sheet metal, having longitudinally extending, alternating ridges and valleys therein, into a helical convolution, comprising: a plurality of rollers having peripheries generally conforming to the shape of said ridges and valleys, mounting means for each of said rollers mounting the same for rotation with its periphery in a plane, means connecting said mounting means and maintaining the planes of the peripheries of said rollers parallel to each other, elongated supporting means supporting said mounting means with the peripheries of said rollers projecting therefrom for engaging said ridges and valleys, said supporting means supporting said mounting means for movement along and with corresponding points on said rollers aligned parallel to the longitudinal axis of said supporting means and for movement changing the angle of the planes of the peripheries of said rollers with respect to said longitudinal axis, said mounting means maintaining said rollers spaced apart along said axis proportional to said angle.

17. A forming roll for use in curling an elongated strip of sheet metal, having longitudinally extending, alternating ridges and valleys therein, into a helical convolution, comprising: a plurality of rollers having peripheries generally conforming to the shape of said ridges and valleys, mounting means for each of said rollers mounting the same for rotation with its periphery in a plane, means connecting said mounting means and maintaining the planes of the peripheries of said rollers parallel to each other, elongated supporting means supporting said mounting means with the peripheries of said rollers projecting therefrom for engaging said ridges and valleys, said supporting means supporting said mounting means for movement along and with corresponding points on said rollers aligned parallel to the longitudinal axis of said supporting means and for movement changing the angle of the planes of the peripheries of said rollers with respect to said longitudinal axis, said mounting means maintaining said rollers spaced apart along said axis proportional to said angle, and means for shifting said connected mounting means together along said axis.

References Cited by the Examiner

UNITED STATES PATENTS

| 367,494 | 8/1887 | Alden | 29—477.3 |
|---|---|---|---|
| 376,681 | 1/1888 | Root | 29—477.3 |
| 1,394,116 | 10/1921 | Rendano | 113—35 |
| 1,918,137 | 7/1933 | Scarritt | 113—35 |
| 2,136,943 | 11/1938 | Freeze | 113—35 |
| 2,200,176 | 5/1940 | Keltie | 29—125 |
| 2,282,176 | 5/1942 | Fay et al. | 113—35 |
| 2,324,050 | 7/1943 | Shelley | 29—125 |
| 3,067,707 | 12/1962 | Ellzey | 113—35 |
| 3,106,177 | 10/1963 | Nicolaisen | 113—35 |

FOREIGN PATENTS

| 4,513 | 3/1893 | Great Britain. |
|---|---|---|

RICHARD J. HERBST, *Primary Examiner.*

WHITMORE A. WILTZ, CHARLES W. LANHAM,
*Examiners.*